United States Patent
Abe et al.

[11] Patent Number: 5,857,761
[45] Date of Patent: Jan. 12, 1999

[54] ILLUMINATION DEVICE

[75] Inventors: Tomiya Abe; Kouki Hirano; Fumitaka Nakahigashi; Masanori Matsumoto; Yoshikazu Hayakawa; Tohru Sasaki, all of Ibaraki-Ken, Japan

[73] Assignee: Hitachi Cable, Ltd., Tokyo, Japan

[21] Appl. No.: 826,591

[22] Filed: Apr. 3, 1997

[30] Foreign Application Priority Data

| Apr. 4, 1996 | [JP] | Japan | 8-082270 |
| Jun. 9, 1996 | [JP] | Japan | 8-236976 |

[51] Int. Cl.⁶ ........................... F21V 8/00
[52] U.S. Cl. ............ 362/32; 362/31; 362/268; 385/47
[58] Field of Search .................. 362/31, 32, 268; 385/31, 39, 43, 47, 48, 128

[56] References Cited

U.S. PATENT DOCUMENTS

| 3,535,018 | 10/1970 | Vasilatos | 362/32 |
| 4,422,719 | 12/1983 | Orcutt | 362/32 |
| 4,585,298 | 4/1986 | Mori | 385/31 |
| 4,822,123 | 4/1989 | Mori | 385/31 |
| 4,936,663 | 6/1990 | Mori | 385/31 |
| 5,074,632 | 12/1991 | Potter | 385/31 |
| 5,530,780 | 6/1996 | Ohsawa | 385/31 |
| 5,695,269 | 12/1997 | Lippmann et al. | 362/32 |

FOREIGN PATENT DOCUMENTS

| 0141308 | 5/1985 | European Pat. Off. . |
| 0675318A1 | 10/1995 | European Pat. Off. . |
| 4329914A1 | 3/1995 | Germany . |
| 2153515 | 8/1985 | United Kingdom . |

*Primary Examiner*—Alan Cariaso
*Attorney, Agent, or Firm*—McDermott, Will & Emery

[57] ABSTRACT

An illumination device comprises a light source like a halogen lamp, a light guide, a round rod-shaped transparent radiation member having a proximal end and a distal end, and a transparent radiation plate. The light guide is a plastic optical fiber comprising a single core of silicon rubber and a cladding layer of tetrafluoroethylene/hexafluoropropylene copolymer. The radiation member is a transparent circular cylinder made of acrylic resin, and has a predetermined pattern of light scattering regions on its surface oppose the directions where the light is radiated. The radiation plate is placed such a position that one side plane of the radiation plate oppose to he radiation member, and also has a predetermined pattern of light scattering regions on the back. The light scattering regions are provided along said radiation member in such a way that a ratio of an tea of one region to that of adjacent region becomes larger as the one region becomes distant from the proximal and of the radiation member.

22 Claims, 7 Drawing Sheets

ILLUMINATION DEVICE

FIELD OF THE INVENTION

This invention relates to an illumination device, and more particularly to, an illumnination device for radiating a predetermined area of light.

BACKGROUND OF THE INVENTION

A relatively thin plane illumirnation device has been extensively used such as for a backlight of a liquid crystal display, an interior illuminator, a signboard, and other various types of displays.

One conventional illumination device comprises a light source for generating a strip of light like a fluorescent tube, and a radiation plate for diffusing the light coupled into one edge thereof and radiating the diffused light from the surface thereof. The first conventional illumination device, however, there is a disadvantage in that many factors, such as a dealing with heat generated by the fluorescent tube, a mechanical protection against the fluorescent tube, must be considered. Especially, since a high-luminescent light source which generated more heat value is easy to break and needs to be mechanically protected, it may not be applicable to an illumination in such a place as no electricity is preferable, or explosion-proof devices are required.

In order to overcome these shortcomings, a use of bundled optical fibers for guiding light from a light source to an edge of a radiation plate has been studied. The second conventional illumination device, however, requires an optical fiber cable having a substantially complicated structure comprising bundled optical fibers, one ends of which are bundled together and optically connected to a light source, and another ends of which are separated with each other and optically connected to one edge of a radiation plate at distributed positions along the edge. Therefore, there are disadvantage in that;

(a) a complicated optical fiber cable and complicated connections between the light source and the radiation plate are necessary. It makes the cost high.

(b) a large space in which the bundled optical fibers are bent and connected to the radiation plate is necessary in the vicinity of interface. As a result, the illumination device becomes bigger and heavier, and a relatively large volume of the illumination device other than an illuminating plane makes it less aesthetic.

SUMMARY OF THE INVENTION

Accordingly, it is an object of the invention to provide an illumination device which is compact and light.

It is a further object of the invention to provide an illumination device by which the connection between a light source and a radiation plate becomes easier.

It is a still further object of the invention to provide an illumination device which is easy to handle.

According to the first feature of the invention, An illumination device for radiating a predetermined area of light comprises a light guide for transmitting light from one end thereof to another end; a rod-shaped transparent radiation member having a proximal end and a distal end, the light being received by the proximal end of the radiation member and radiated therefrom in a predetermined range of radial directions along the radiation member; and a transparent radiation plate, one side plane of which opposes to the radiation member so that the radiated light from the radiation member is coupled into the radiation plate, and radiated from a front surface thereof.

According to the second feature of the invention, an illumination device for radiating a predetermined area of light comprises a rod-shaped transparent radiation member having a proximal end and a distal end, light being received by the proximal end of the radiation member and radiated therefrom in a predetermined range of radial directions along the radiation member, the rod-shaped transparent radiation member being provided with a plurality of light scattering regions having a predetermined area on its surface opposite the directions; wherein the plurality of light scattering regions are provided along said radiation member in such a way that a ratio of an area of one region to that of adjacent region becomes larger as the one region becomes distant from the proximal end of the radiation member.

BRIEF DESCRIPTION OF THE DRAWINGS

The invention will be explained in more detailed in conjunction with the appended drawings, wherein.

DESCRIPTION OF THE PREFERRED EMBODIMENTS

Figure 1:
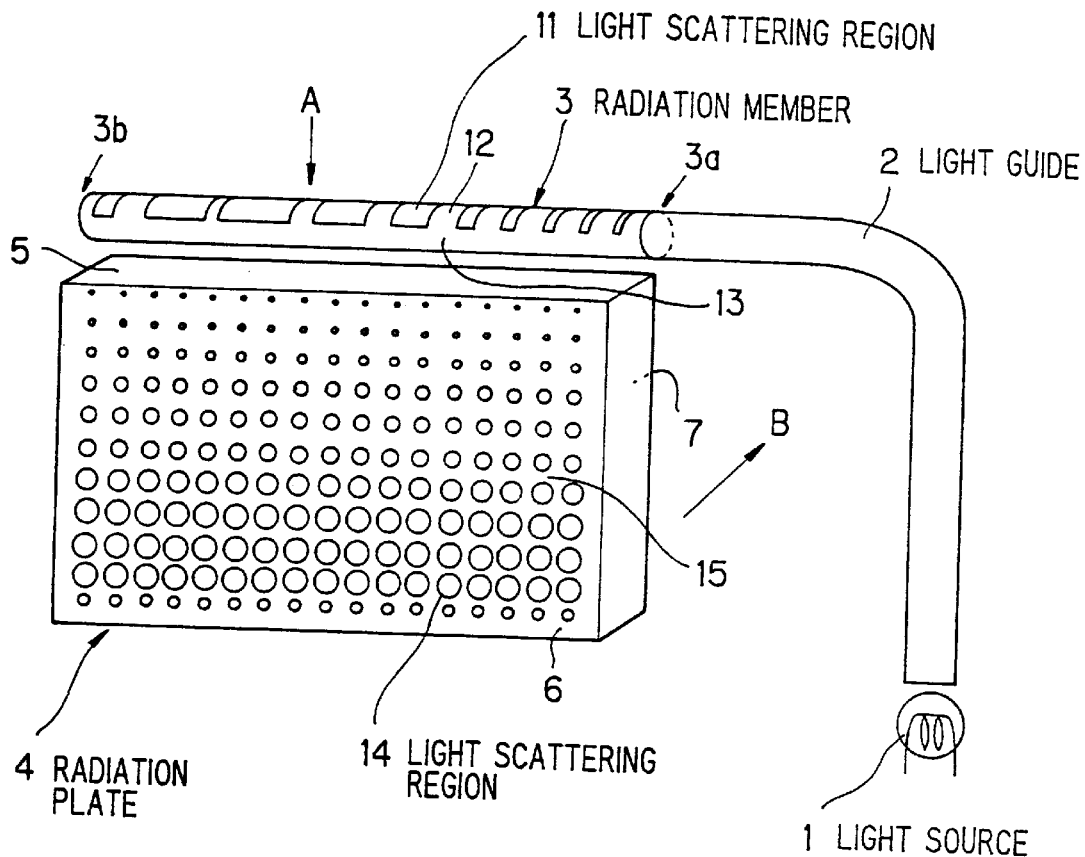
FIG. 1 is a perspectiire view showing an illumination device in a first preferred embodiment according to the invention.

An illumination device for radiating a predetermined area of light in accordance with the invention comprises a light guide for transmitting light from one end thereof to another end, a rod-shaped transparent radiation member having a proximal end and a distal end, and a transparent radiation plate. Light from a light source is received by the proximal end of the radiation member and radiated therefrom in a predetermined range of radial directions along the radiation member. One side plane or edge of the radiation plate opposes to the radiation member so that the radiated light from the radiation member is coupled into the transparent plate, and radiated from a front surface thereof.

In view of flexibility, lightness and handling of the light guide, the most preferable light guide to be used in the invention is a plastic optical fiber comprising a core and a cladding layer. Bundled glass optical fibers may cost high. In this case, in view of temperature elevation due to the heat of a light source, the materials of the plastic optical fiber need to be selected from materials having relatively high heat resistance characteristics. For example, a silicon resin, which is relatively high heat-resisting and soft, is preferably used as the core, and a fluorine-contained class resin, such as polytetrafluoroethylene, tetrafluoroethylene/ hexafluoropropylene copolymer, ethylene/ tetrafluoroethylene copolymer, tetrafluorcethylene/ vinylidenefluoride copolymer is preferably used as the cladding layer.

The light guide may include both a single core light guide and a multiple-core light guide. The single core light guide having a relatively large core is preferably used in view of a light-collection efficiency from the light source and a light-coupling efficiency to a radiation member. Therefore, the diameter of the core is preferably between 2 mm and 30 mm. If the diameter of the core is smaller than 2 mm, the light-collection efficiency becomes worse and a desirable power of radiation may not be obtained, while the diameter is larger than 30 mm, the light guide becomes rigid and difficult to handle.

The material of the radiation member includes any transparent materials, such as glasses and resins. Glass has a higher transmission efficiency than a resin so that the glass is more useful for a relatively longer radiation member, while the resin is more useful in view of lightness, productivity and handling. The preferable resin includes acrylic resin, polycarbonate resins and polystyrene resin due to transparency and productivity. In view of saving the space, the light is more preferably couple into a single end (i.e., a proximal end) of the radiation member, however, the light may also be coupled into both proximal and distal ends of the radiation member.

The material of the radiation plate includes any transparent material, and more preferably includes a plastic resin having a relatively high transparency such as acrylic resin, polycarbonate resin, and polystyrene resin in view of formation and afterward formation thereof. The radiation plate is preferably a flat plane plate due to productivity, but includes plates having a curved surface. In view of saving the space, the radiated light form the radiation member is more preferably couple into one edge (i.e. side plane) of the radiation plate, however, the radiated light may also be coupled into other edges (i.e. other side planes) of the radiation plate.

The radiation member is preferably provided with at least one light scattering region having a predetermined area on its surface opposite the directions in which the light is radiated. Moreover, the radiation plate is preferably provided with at least one light scattering region on the back. The light scattering regions include a plurality of regions of paint or scratches for scattering a part of the light coupled into the radiation member or the radiation plate, and preferably have strip shapes in view of productivity.

The light coupled into the radiation member or the radiation plate is scattered by the light scattering regions and radiated in a predetermined area of directions perpendicular to the direction in which the light from the light guide is transmitted, i.e., in the directions oppose the light scattering regions.

The plurality of light scattering regions are preferably provided along the radiation member in such a way that a ratio of an area of one region to that of adjacent region becomes larger as the one region becomes distant from the proximal end of the radiation member. Although the light power in the radiation member becomes weak as the light transmits through the radiation member, such an arrangement of the light scattering regions makes the power of scattered light stronger as it becomes distant from the proximal end of the radiation member. As a result, a strip of light having an uniform power distribution is radiated from the radiation member.

The radiation member is preferably provided with a light reflector on the distal end. The reflector includes a reflection mirror, and a diffuse reflection plate.

The radiation member is preferably provided with a matching oil layer (i.e., a refraction matching medium layer) around the radiation member as a coating layer. In this case, the refractive index of the matching oil layer is substantially the same as that of the radiation member. The matching oil smooths the surface of the radiation member where undesirable scratches may exist; otherwise the scratches may cause undesirable scattering of the light and deterioration of the radiation characteristics.

The refractive index of the refraction matching medium layer $n_m$ satisfies the condition in that: $0.955n_0 < n_m < 1.05n_0$, where $n_0$ is the refractive index of the radiation member.

Moreover the distal end of the radiation member is an inclined flat end against its longitudinal axis, The distal end is preferably inclined by between 91° and 100° against its longitudinal axis of the radiation member. If the angle of inclination is blow 91°, especially 90°, the end is easy to produce, but too much reflected light makes the radiation power weak. On the other hand, if the angle is above 100°, the radiation in the vicinity of the distal end becomes solely strong and uneven along the radiation member. Moreover, the distal end of the radiation member may be a convexly curved end.

The plurality of light scattering regions are preferably arranged such that a ratio of an area of one region to that of adjacent region becomes larger as the one region becomes distant from the proximal end of the radiation member, so that the luminance of the radiated light is uniform along the radiation member.

The plurality of light scattering regions are preferably formed from a plurality of resin strips or films bearing at least one substance for scattering light, such as titanium oxide, magnesium oxide, and zinc sulfate. Each resin strips or films are preferably provided with a adhesive layer, the refractive index $n_r$ thereof preferably satisfy the condition in that $0.95n_0 < n_r < 1.05n_0$.
wherein $n_0$ is the refractive index of said radiation member. If the refractive index $n_r$ is out of the range, the power of radiation becomes weak.

In accordance with the invention, an opal light diffuser is preferably placed in such a position that the light diffuser is irradiated by the radiated light from the radiation member.

More preferably, the radiation member further includes a transparent cladding layer surrounding the radiation member, and a light diffusion layer surrounding the cladding layer. In this case, the radiation member is preferably provided with an outmost transparent resin layer for mechanical protection. In view of transparency and intimate contact, the outmost transparent resin layer is preferably a transparent thermo-contractive tube, the material of which includes polyethylene, ethylene vinyl acetate copolymer, tetraflouroethylene/hexaflouroproplyene copolymer, and tetrafluorcethylene/perfluoroarkylvinylether copolymer The radiation member may have a cross-sectional shape being selected from the group consisting of a circle, an ellipse, and a polygon with more than four sides and angles. A triangle pole is not suitable to obtain it desirable power of radiation. Moreover, the radiation member may be a tapered rod.

Next, an illumination device in the first preferred embodiment will be explained in FIG. 1. The illumination device comprises a light source 1 for generating light like a halogen lamp (100 W), a light guide 2 for transmitting the light from one end to another end, a round rod-shaped transparent radiation member 3 having a proximal end 3a and a distal end 3b, and a transparent radiation plate 4.

The light guide 2 is a plastic optical fiber comprising a single core of silicon rubber (the refractive index thereof is 1.50) and a cladding layer of tetrafluoroethylene/hexafluoropropylene copolymer. In the first preferred embodiment the fiber length is 2 m, a diameter of the core is 10 mm and a thickness of the cladding layer is 0.5 mm.

Figure 2:
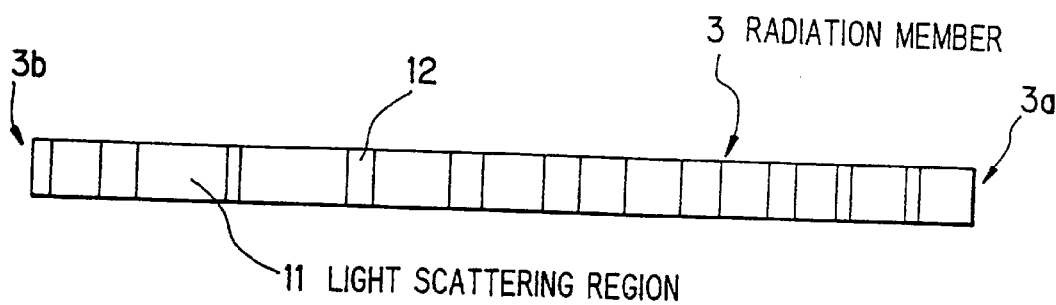
FIG. 2 is a plaan view taken in the direction of the arrow A of FIG. 1 showing a radiation member in the first preferred embodiment.

FIG. 2 shows the radiation member 3, which is taken in the direction of the arrow A of FIG. 1. The radiation member 3 is a transparent circular cylinder made of acrylic resin which has a diameter of 10 mm and a length of 500 mm. The radiation member 3 has a predetermined pattern of light scattering regions 11 on its surface oppose the directions where the light is radiated. In order to scatter the light traveling over the radiation member 3, the predetermined pattern of the light scattering regions 11 are provided on the back of the radiation member 3 by applying paints which contains corpuscles of titanium oxide in strip shape with spaces 12 along the radiation member 3, so that the light is efficiently radiated through the front side 13 of the radiation member 3.

The radiation plate 4 is a flat transparent plate of 500 mm wide, 300 mm high and 10 mm thick, which is placed such a position that one side plane 5 of the radiation plate 4 oppose to the radiation member so that the radiated light from the radiation member 3 is coupled into the radiation plate 4 efficiently. As shown in FIG. 1, the radiation plate 4 also has a predetermined pattern of light scattering regions 14 on the back 6 so that the scattered light is radiated through the front surface 7 of the radiation plate 4. The predetermined pattern of light scattering regions 14 are also provided by applying paints which includes corpuscles of titanium oxide in spot shape, which have different diameters with each other along the direction toward another side plane oppose the one side plane 5.

In operation, the light from the light source 1 is transmitted through the light guide 2 and coupled into the proximal end 3a of the radiation member 3. Then, while being transmitted through the radiation member 3, the light is scattered by the light scattering regions 11, and radiated from the radiation member 3 in a predetermined range of radial directions along the radiation member 3 through the front side 13, then coupled into the radiation plate 4 through the one side plane 5 thereof. In the radiation plate 4, the coupled light is scattered by the light scattering regions 14 and radiated through the front surface 7 of the radiation plate 4 in the directions, which is indicated by arrow B in FIG. 1.

According to the first preferred embodiment, since the radiation member 3 is positioned on the side of the radiation plate 4 so as to couple the light guide 2 to the radiation member 4, both the radiation member 3 and the radiation plate 4 may be put into a single case having a relatively small volume. Therefore, a small and light illumination device for radiating light from the surface of a radiation plate with an isolated light source is obtained.

Figure 3:
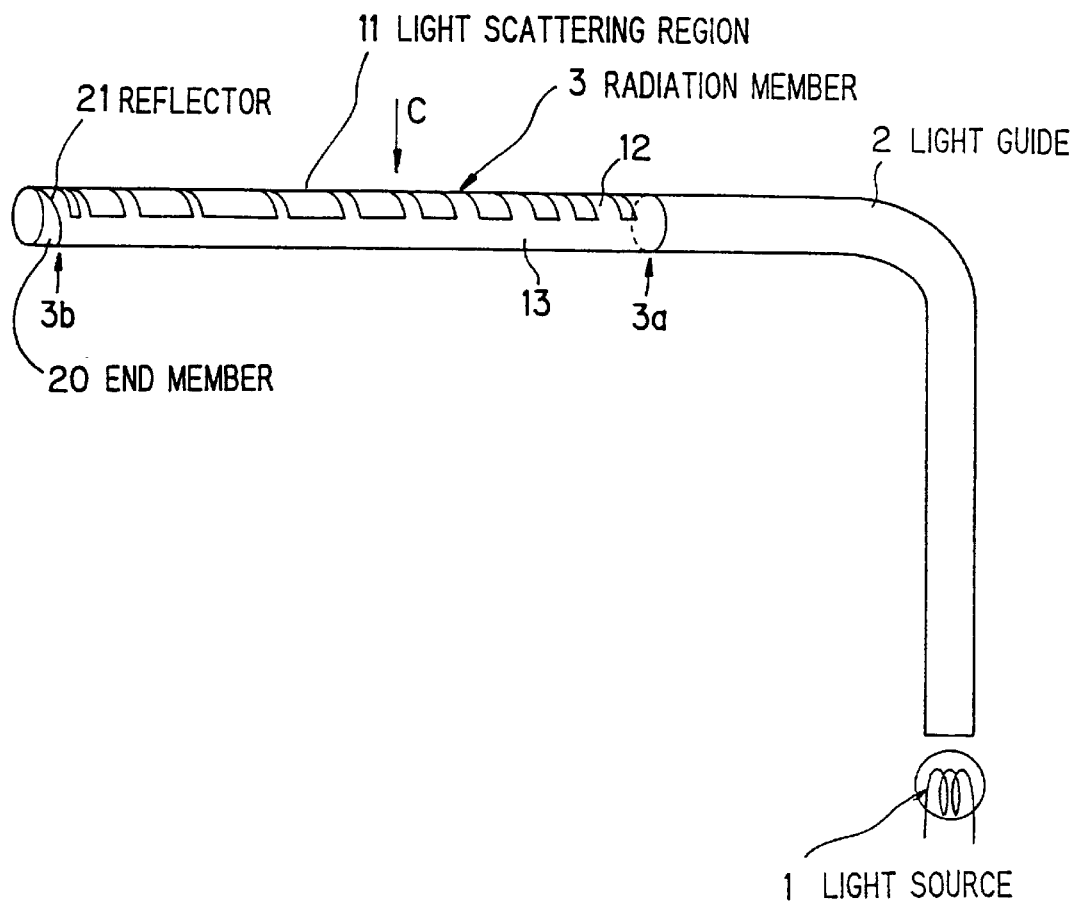
FIG. 3 is a view similar to FIG. 1, but showing an illumination device in a second preferred embodiment according to the invention.

FIG. 3 shows an illumination device in the second preferred embodiment according to the invention, wherein like parts are indicated by like reference numerals as used in FIG. 1. The illumination device comprises a light source 1 of a metal halide lamp (60 W), a light guide 2 for transmitting the light from one end to another end, a round rod-shaped transparent radiation member 3 having a proximal end 3a and a distal end 3b. A radiation plate used in the first preferred embodiment is omitted in the second preferred embodiment shown in FIG. 3, however, it may be optionally included.

The light guide 2 is a plastic optical fiber comprising a single core of silicon rubber (the refractive index thereof is 1.50) and a cladding layer of tetrafluoroethylene/hexafluoropropylene copolymer. In the first preferred embodiment, the fiber length is 2 m, a diameter of the core is 10 mm and a thickness of the cladding layer is 0.5 mm.

Figure 4:
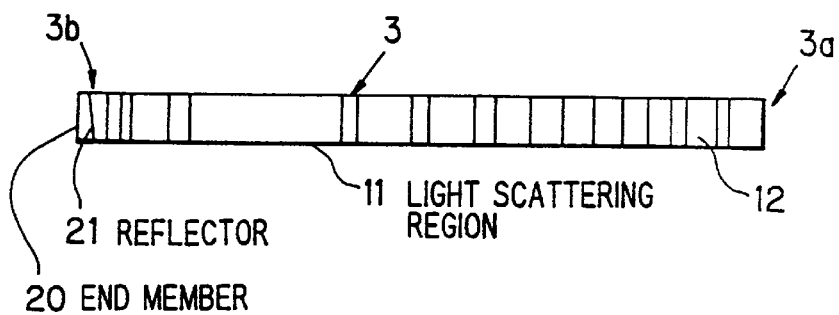
FIG. 4 is a plane view taken in the direction of the arrow C of FIG. 3 showing a radiation member in the second preferred embodiment.

FIG. 4 shows the radiation member 2, which is taken in the direction of the arrow C of FIG. 3. The radiation member 3 is a transparent circular cylinder made of acrylic resin (refractive index thereof is 1.49) which has a diameter of 10 mm and a length of 300 mm. The radiation member 3 has a predetermined pattern of light scattering regions 11 on its surface oppose the directions where the light is radiated. In order to scatter the light traveling over the radiation member 3 and obtain uniform radiation therefrom, the predetermined pattern of the light scattering regions 11 are provided on the hack of the radiation member 3 in such a way that a ratio of an area of one region to that of adjacent region becomes larger as the region becomes distant from the proximal end 3a of the radiation member 3. In this case, among a few regions in the vicinity of the distal end 3b of the radiation member 3, a ratio of an area of one region to that of adjacent region becomes smaller in view of reflection of the light at the distal end 3b. These light scattering regions are made by applying paints which includes corpuscles of titanium oxide in strip shape with spacer 12 along the radiation member 3.

Figure 5:
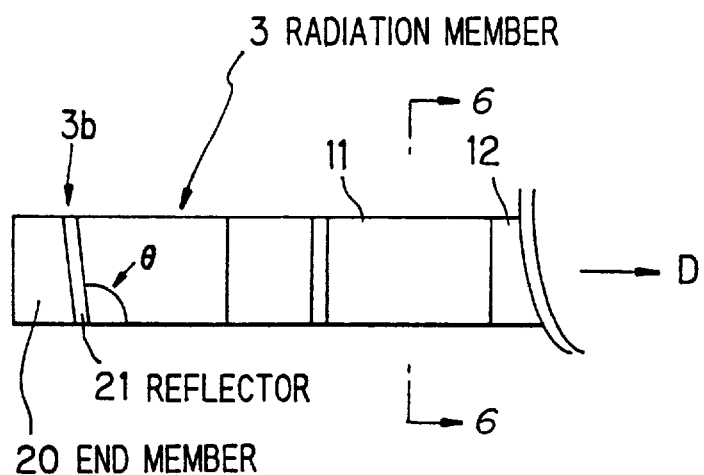
FIG 5 is an enlarged fragmentary view showing a distal end of the radiation fewer in FIG. 4.

FIG. 5 show the distal end 3b of the radiation member 3 in detail, wherein the proximal end 3a to be optically connected to the light guide 2 (indicated by arrow D) is omitted. The distal end 3b is an inclined flat end against its longitudinal axis by an angle θ=930°. On the distal end 3b, the radiation member is provided with a reflector 21, which is made from a polyethylene telephthalate film of about 0.1 mm thickness on which a vapor-deposited silver layer is coated, and an end member 20 which protect the distal end 3b and the reflector 21 thereon.

Figure 6:
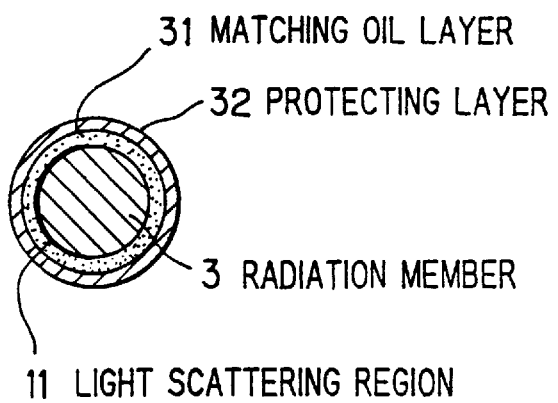
FIG. 6 is a cross-sectional view taken along the lines 6—6 of FIG. 5.

As shown in FIG. 6, which is taken along the lines 6—6 of FIG. 5, the radiation member 3 is provided with a matching oil layer 31 of silicon oil (i.e., a refraction matching medium layer) around the radiation member the refractive index of which is 1.50. The matching oil layer 31 prevents radiation characteristics from deteriorating due to possible small scratches on the radiation member 3. In order to mechanically protect the radiation member 3 and the matching oil layer 31, a protecting layer 32 of a transparent thermo-contractive tube, the material of which is tetrafluoroethylene/hexafluoropropylene copolymer, is further provided on the matching oil layer 31 as an outmost transparent resin layer.

In operation the light from the light source 1 is transmitted over the light guide 2 and coupled into the proximal end 3a of the radiation member. The power of the light becomes weaker as the light travels toward the distal end 3b of the radiation member 3. On the other hand, the light traveling through the radiation member 3 is scattered by the light scattering regions 11 and the per distribution of the scattered light becomes stronger as it goes to the distal end 3b of the radiation member 3, because the light scattering regions 11 are provided along the radiation member 3 in such a way that a ratio of an area of one region to that of adjacent region becomes larger as the one region becomes distant front the proximal end 3a of the radiation member 3. As a result, the power distribution of the light radiated from the radiation member through the front side 13 becomes uniform along the radiation member 3.

According to the second preferred embodiment, a small and light illumination device for radiating longitudinal light with an isolated light source is obtained.

Figure 7:
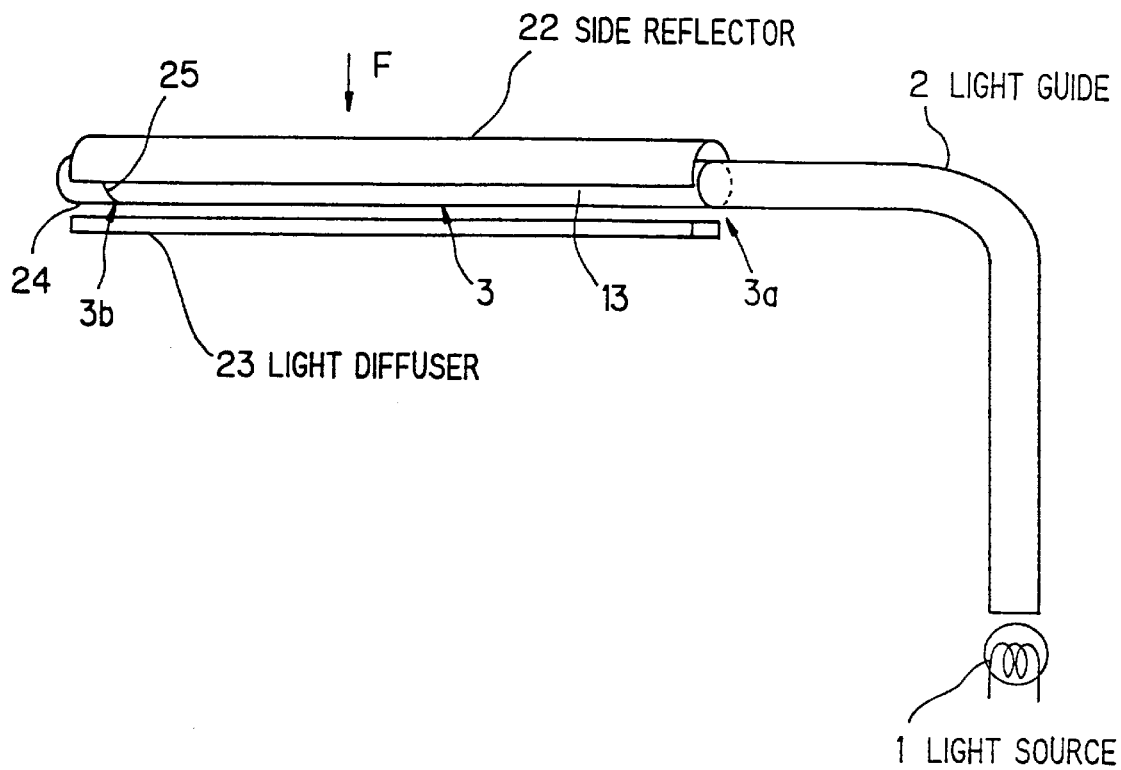
FIG. 7 is a view similar to FIG. 3, but showing an illumination device in a third preferred embodiment according to the invention.

FIG. 7 shows an illumination device in the third preferred embodiment according to the invention, wherein like parts are indicated by like reference numerals as used in FIG. 4.

The differences from the second preferred embodiment shown in FIG. 4 are that, according to the illumination device in the third preferred embodiment, the radiation member 3 is further provided with a side reflector 22 on the back and a light diffuser 23 oppose the front side 13 thereof, both of which longitudinally extend from the proximal end 3a to the distal end 3b. The side reflector is a reflection mirror plate having a semicircular cross-section, which surrounds the back side surface of the radiation member 3 (i.e., the surface where light scattering regions 11 are provided) with a predetermined spacing and mechanically connected to the distal end 3b of the radiation member 3 through an end member 24. The distal end 3b is an inclined flat end against its longitudinal axis by an angle $\theta = 93°$.

On the other hand, the light diffuser 23 which is positioned on the front side 13 of the radiation member 3 is an opal acrylic plate having a thickness of 2 mm (Sumipex 030 Opal, made by Sumitomo Chemical Co., Ltd). The light diffuser 23 reduces the nonuniformity of the radiation due to the predetermined pattern of the light scattering regions 11 provided on the back side of the radiation member 3.

Figure 8:
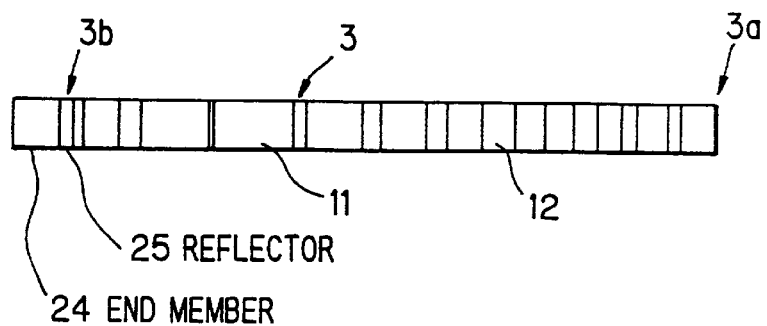
FIG. 8 is a plane view taken in the direction of the arrow F of FIG. 7 showing a radiation member in the third preferred embodiment.

FIG. 8 shows the radiation member 3, which is taken in the direction of the arrow F of FIG. 7. On the distal end 3b, the radiation member 3 is provided with a reflector 25, which is made from a polytetraethylenetelephthalate film on which a vapor-deposited silver layer is coated. The end member 24 not only mechanically protects the distal end 3b and the reflector 21 thereon but also supports the side reflector 22. Other than these features, the radiation member 3 has the same structure as shown in FIG. 6.

Now, characteristics of radiation of the illumnination device in the third preferred embodiment by changing many factors; (a) the angle or shape of the distal end of the radiation member, (b) the refractive index of the matching oil layer, (c) the materials and the refractive index of the light scattering regions, and (d) the shape of the radiation member itself, will be discussed below by the following examples and comparisons.

[EXAMPLE 1]

In the third preferred embodiment, a 60 W metal halide lamp is used as the light source 1 and an average luminance is measured on the light diffuser 23. The average luminance is 6500 cd/m$^2$.

[EXAMPLE 2]

The angle $\theta$ of the inclined distal end 3b of the radiation member 3 is 95°.

[EXAMPLE 3]

Figure 9:
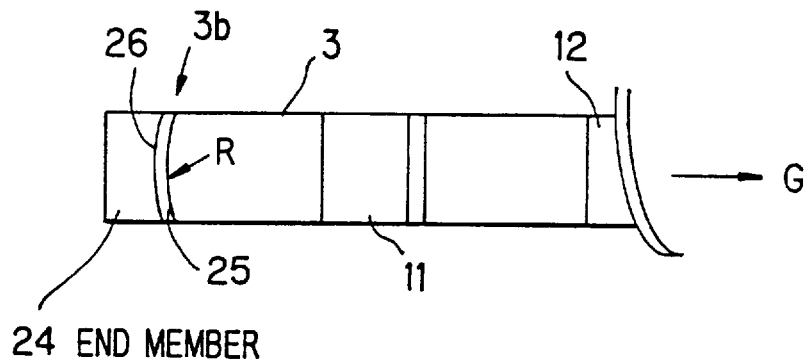
FIG. 9 is an enlarged fragmentary view showing a distal end of a modified radiation member in the third preferred embodiment.

The distal end 3b is a convexly curved end 26 having a radius of curvature R=50 mm, which is shown in FIG. 9 in detail, wherein arrow G indicates the direction toward the proximal end 3a (not shown) to be connected to the light guide 2 (not shown).

[EXAMPLE 4]

The refractive index n of the matching oil layer 31 is 1.52.

[EXAMPLE 5]

The refractive index $n_m$ of the matching oil layer 31 is 1.40.

[EXAMPLE 6]

Each light scattering region 11 comprises a strip of a polyethylene telephthalate film of 0.1 mm thickness which contains 1 weight % of titanium oxide, and an adhesive layer provided on the back side of the film (hereinafter referred to as TYPE A). The refractive index $n_r$ of the adhesive layer is 1.50.

[EXAMPLE 7]

Each light scattering region 11 comprises a strip of a polyethylene telephthalate film of TYPE A. The refractive index $n_r$ of the adhesive layer is 1.53.

[EXAMPLE 8]

Each light scattering region 11 comprises a strip of a polyethylene telephthalate film of 0.1 mm thickness, a diffusion paint layer which contains corpuscles of titanium oxide on the film, and an adhesive layer provided on the back side of the film (hereinafter referred to as TYPE B) The refractive index $n_r$ of the adhesive layer is 1.50.

[EXAMPLE 9]

Figure 10A:
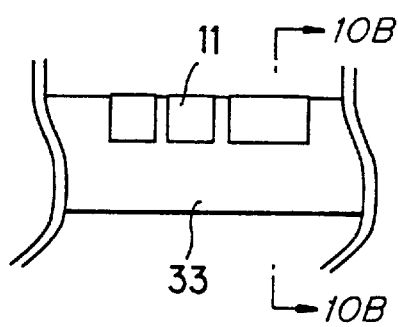
FIGS. 10A and 10B are a fragmentary aide view and a cross-sectional view taken along the lines 10—10 showing another modified radiation member in the third preferred embodiment, respectively.
Figure 10B:
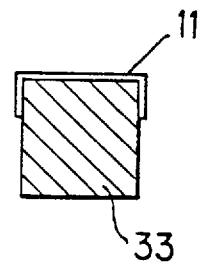

The cross-sectional shape of the radiation member 3 is a regular quadrangle with a side length of 9 mm, the detail of which is shown in FIGS. 10A and 10B.

[EXAMPLE 10]

Figure 11A:
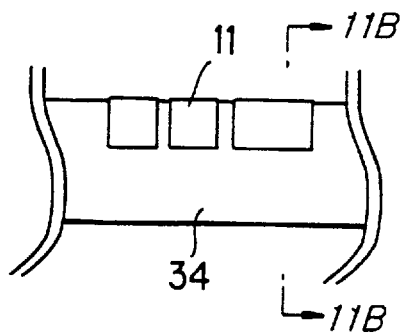
FIGS. 11A and 11B are views similar to FIGS. 10A and 10B, but showing another modified radiation member in the third preferred embodiment.
Figure 11B:
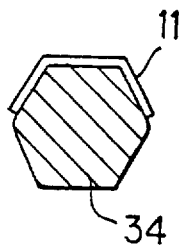

The cross-sectional shape of the radiation member 3 is a regular hexagon with a side length of 5 mm, the detail of which is shown in FIGS. 11A and 11B.

[COMPARISON 1]

The angle $\theta$ of the inclined distal end 3b of the radiation member 3 is 90°.

[COMPARISON 2]

The angle θ of the inclined distal end 3b of the radiation member 3 is 105°.

[COMPARISON 3]

The refractive index $n_m$ of the matching oil layer 31 is 1.59.

[COMPARISON 4]

A matching oil layer is omitted from the radiation member 3.

[COMPARISON 5]

Each light scattering region 11 comprises a strip of a polyethylene telephthalate film of TYPE A. The refractive index $n_t$ of the adhesive layer is 1.39.

[COMPARISON 6]

Each light scattering region 11 comprises a strip of a polyethylene telephthalate film of TYPE B. The refractive index $n_t$ of the adhesive layer is 1.60.

[COMPARISON 7]

Figure 12A:
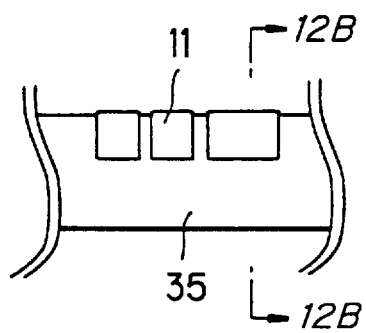
FIGS. 12A and 12B are views similar to FIGS. 10A and 10B, but showing a modified radiation member for comparison purpose.
Figure 12B:
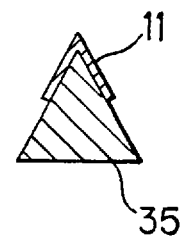

The cross-sectional shape of the radiation member 3 is a regular triangle with a side length of 13 mm, the detail of which is show in FIGS. 12A and 12B.

The results of measured average luminances of the above-mentioned examples and comparisons are summarized in TABLES 1, 2, 3 and 4.

TABLE 1

| ITEM | STATE OF DISTAL END | AVERAGE LUMINANCE (cd/m²) |
|---|---|---|
| EXAMPLE 1 | θ = 93° | 6500 |
| EXAMPLE 2 | θ = 95° | 5700 |
| COMPARISON 1 | θ = 90° | 4800 |
| COMPARISON 2 | θ = 105° | 2200 |
| EXAMPLE 3 | CONVEXLY CURVED END WITH RADIUS CURVATURE R = 50 mm | 6300 |

TABLE 2

| ITEM | REFRACTIVE INDEX OF MATCHING OIL LAYER | AVERAGE LUMINANCE (cd/m²) |
|---|---|---|
| EXAMPLE 1 | 1.50 | 6500 |
| EXAMPLE 4 | 1.52 | 6000 |
| EXAMPLE 5 | 1.40 | 4000 |
| COMPARISON 3 | 1.59 | 4300 |
| COMPARISON 4 | MATCHING OIL LAYER OMITTED | 3000 |

TABLE 3

| ITEM | STRUCTURE OF LIGHT SCATTERING REGION | REFRACTIVE INDEX OF ADHESIVE LAYER | AVERAGE LUMINANCE (cd/m²) |
|---|---|---|---|
| EXAMPLE 6 | TYPE A | 1.50 | 5800 |
| EXAMPLE 7 | TYPE A | 1.53 | 5500 |
| EXAMPLE 8 | TYPE B | 1.50 | 5200 |
| COMPARISON 5 | TYPE A | 1.39 | 4100 |
| COMPARISON 6 | TYPE A | 1.60 | 3900 | where the refractive index of the radiation member $n_0$=1.49.

TABLE 4

| ITEM | CROSS-SECTIONAL SHAPE OF RADIATION MEMBER | AVERAGE LUMINANCE (cd/m²) |
|---|---|---|
| EXAMPLE 1 | 10 mm diameter | 6500 |
| EXAMPLE 9 | REGULAR QUADRANGLE OF 9 mm SIDE LENGTH | 5000 |
| EXAMPLE 10 | REGULAR HEXAGON OF 5 mm SIDE LENGTH | 5200 |
| COMPARISON 7 | REGULAR TRIANGLE OF 13 mm SIDE LENGTH | 2000 |

TABLE 1 shows results of measured average luminance of example and comparisons by changing the angle of the distal end 3b or the shape thereof of the radiation member 3 of the illumination device in the third preferred embodiment, while other conditions of the illumination device are the same.

TABLE 2 shows similar results by changing the refractive index of the matching oil layer 31 of the radiation member 3 or omitting the matching oil layer 31.

TABLE 3 shows similar results by changing the structure of the light scattering regions 11 or changing the refractive index $n_t$ of the adhesive layer.

TABLE 4 shows similar results by changing the cross-sectional shape the radiation member 3.

As apparent from TABLES 1–4, it is preferable that the angle θ of the inclined distal end 3b is 91°–100°, the refractive index $n_m$ of the matching oil layer is $0.95n_0 < n_m < 1.05n_0$, the refractive index $n_t$ of the adhesive layer of the light scattering region is $0.95n_0 < n_t < 1.05n_0$, and the cross-sectional shape of the radiation member is selected from a polygon with more than four sides and angles and a circle.

According to the second and third preferred embodiment the illumination device is also useful as a light source for an edge light type backlight device.

Figure 13:
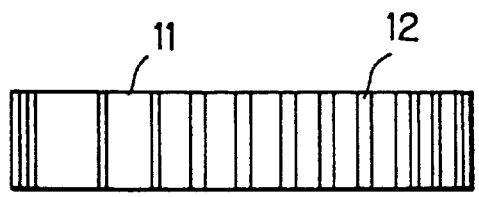
FIG. 13 is a view showing an example of a pattern of light scattering regions in the invention.

As explained above, the radiation member preferably has a plurality of light scattering regions which are provided along the radiation member in such a way that a ration of an area of one region to that of adjacent region becomes larger as the one region becomes distant from the proximal end of the radiation member, such as shown in FIG. 13. This arrangement of the light scattering regions makes the power distribution of the radiated light from the radiation member uniform along the radiation member. It the radiation member of the illumination, device is substituted for a longitudinally linear luminescent light source like a fluorescent tube, however, the radiation member radiates light of incomplete Longitudinal linearity which has the similar pattern to FIG. 13.

In order to improve the longitudinal linearity of the radiated light, following modifications of the radiation member are preferably implemented.

[MODIFICATION 1]

The radiation member ray be covered by a diffusion layer, which may be attached to the periphery of the radiation member as an adhesive sheet. If the diffusion layer directly contacts the surface of the radiation member, a part of the light is diffused at the interface between them and scattered toward undesirable directions, which results in the loss of power.

Figure 14:
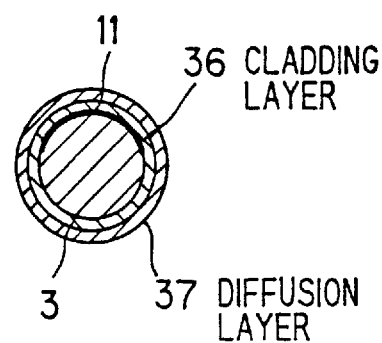
FIG. 14 is a cross-sectional view showing another modified radiation member according to the invention.
Figure 15:
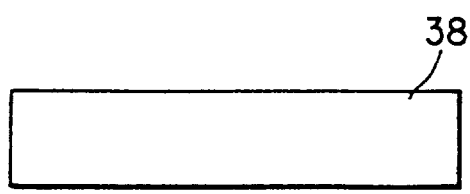
FIG. 15 is a explanatory view showing radiated light through a light diffuser.

FIG. 14 shows a modified radiation member which avoids this shortcoming. The radiation member 3 having light scattering regions 11 is covered by a cladding layer 36 of tetrafluoroethylene/hexafluoropropylene copolymer (the refractive index thereof is 1.34), and the cladding layer is covered by a diffusion layer 37. According to the modification of the radiation member, only the scattered light by the light scattering regions 11 can be radiated from the radiation member 3 through the diffusion layer. Therefore, the pattern of the light similar to FIG. 13 is no longer observed, and longitudinally linear luminescent light without luminance spots or stripes, such as shown in FIG. 15, is obtained.

[MODIFICATION 2]

Figure 16A:
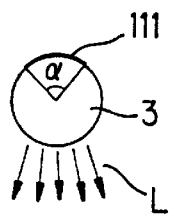
FIGS. 16A and 16B are explanatory views showing radiation angles of the radiated light.
Figure 16B:
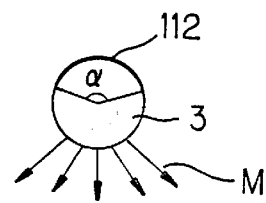

Most preferred cross-sectional shapes of the radiation member are a circle and an ellipse. This is because the angle of the directions of the radiated light can easily be adjusted by changing the angle α by which the light scattering regions are provided, as shown in FIGS. 16A and 16B. If the angle α is small (i.e., the narrower light scattering regions 111 is provided), the light is radiated narrowly, as indicated by L in FIG. 16A. As the angle α becomes larger (i.e., the light scattering regions becomes wider), the light is radiated more widely, as indicated by M in FIG. 16B.

Regarding the angle α, the angle α (i.e., the area of the light shattering regions) needs to be smaller as the light coupled into the proximal end is not desirably transmitted over a relatively longer distance toward the distal end. Therefore, the angle of the radiated light is limited, and more complicated modifications, such as an addition of lens to enhance the angle, are necessary. To overcome this shortcoming, a radiation member having a polygonal cross-sectional shape may be used. Although the angle of the radiated light is substantially determined by the shape itself, the light coupled into the proximal end is desirably transmitted to the distal end which is more distant from the proximal end.

Moreover, a reflector which described above, or a paint which contains light diffusion material may be provided on the distal end so as to sufficiently utilize the light coupled into the radiation member.

[MODIFICATION 3]

Figure 17B:
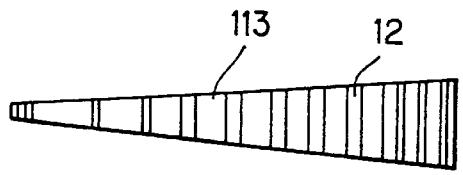
FIGS. 17A and 17B are a perspective view arid a plane view showing another modified radiation member according to the invention.
Figure 17A:
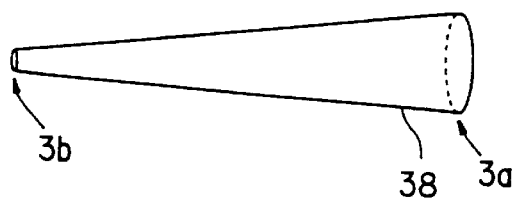

The radiation member may be a tapered rod. FIG. 17A shows a modified radiation member 38 wherein an area of cross-section becomes smaller as it goes from the proximal end 3a to the distal end 3b. FIG. 17B shows an example of a pattern of the light scattering regions 113 provided on the radiation member 38.

[MODIFICATION 4]

Figure 18B:
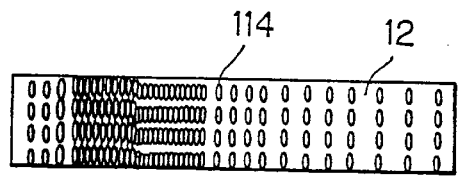
FIGS. 18A and 18B are views similar to FIGS. 17A and 17B, but showing another modified radiation member according to the invention.
Figure 18A:
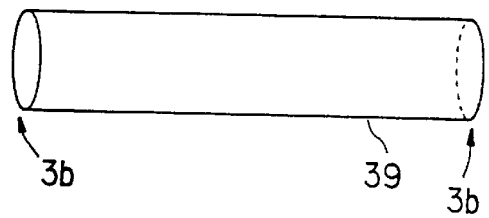

Each light scattering region provided on the radiation member may have a circular shape, or an ellipse shape, FIGS. 18A and 18B show an example of a modified radiation member. The radiation member of circular cylinder 39 is provided with a predetermined pattern of elliptical light scattering regions 114 thereon.

In the overall embodiments in accordance with the invention, a light-emitting diode or the sun may be used as the light source instead of a halogen lamp or a metal halide lamps. The light guide is not limited to a plastic optical fiber but includes bundled glass optical fibers which appropriately collect the light from the light source. Moreover, the shape of the light scattering region includes a triangle, and a polygon with more than four sides and angles. The substance for diffusing light which the light scattering region bears includes titanium oxide, magnesium oxide, and zinc sulfate. The material of the reflector an the distal end includes silver, aluminum, and stainless steel.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. An illumination device for radiating a predetermined area of light, comprising:

a light guide for transmitting light from one end thereof to another end;

a rod-shaped transparent radiation member having a proximal end and a distal end, said light being received by said proximal end of said radiation member and radiated therefrom in a predetermined range of radial directions along said radiation member; and a transparent radiation plate having a planar side which opposes said radiation member so that said radiated light from said radiation member is coupled into said radiation plate, and radiated from a front surface of said transparent radiation plate, wherein said rod-shaped transparent radiation member is provided with at least one light scattering region having a predetermined area on its surface opposite said directions; and wherein a plurality of light scattering regions are provided along said radiation member in such a way that a ration of an area of one region to that of adjacent region becomes larger as said one region becomes distant from said proximal end of said radiation member.

2. An illumination device for radiating a predetermined area of light, comprising:

a rod-shaped transparent radiation member having a proximal end and a distal end, light being received by said proximal end of said radiation member and radiated therefrom in a predetermined range of radial directions along said radiation member, said rod-shaped transparent radiation member being provided with a plurality of light scattering regions having a predetermined area on its surface opposite said directions;

wherein said plurality of light scattering regions are provided along said radiation member in such a way that a ration of an area of one region to that of adjacent region becomes larger as said one region becomes distant from said proximal end of said radiation member, wherein said radiation member further includes a transport cladding layer surrounding said radiation member, and a light diffusion layer surrounding said cladding layer.

3. An illumination device for radiating a predetermined area of light, comprising:

a rod-shaped transparent radiation member having a proximal end and a distal end, light being received by said proximal end of said radiation member and radiated therefrom in a predetermined range of radial directions along said radiation member, said rod-shaped transparent radiation member being provided with a plurality of light scattering regions having a predetermined area on its surface opposite said directions, said plurality of light scattering regions being provided along said radiation member in such a way that a ration of an area of one region to that of adjacent region becomes larger as said one region becomes distant from said proximal end of said radiation member; and a transparent radiation plate having a planar side which opposes said radiation member so that said radiated light from said radiation member is coupled into said radiation plate, and radiated from a front surface of said transparent radiation plate.

4. An illumination device, according to claim 3, further comprising a light guide for transmitting light from one end thereof to another end.

5. An illumination device, according to claim 4, wherein said light guide is a plastic optical fiber having relatively high heat-resisting characteristics.

6. An illumination device, according to claim 3, wherein said plurality of light scattering regions includes a region of paint for scattering a part of said light.

7. An illumination device, according to claim 3, wherein said plurality of light scattering regions includes a region of scratches for scattering a part of said light.

8. An illumination device, according to claim 3, wherein said radiation plate is provided with at least one light scattering region on a back surface thereof opposite said front surface.

9. An illumination device, according to claim 3, wherein said radiation member is provided with a light reflector at said distal end.

10. An illumination device, according to claim 9, wherein said radiation member is provided with a refraction matching medium layer around said radiation member, the refractive index thereof being substantially the same as that of said radiation member.

11. An illumination device, according to claim 10, wherein:

the refractive index of said refraction matching medium layer $n_m$ satisfies the condition in that $$0.95n_0 < n_m < 1.05n_0$$

where $n_0$ is the refractive index of said radiation member.

12. An illumination device, according to claim 3, wherein said distal end of said radiation member is an inclined flat end against its longitudinal axis.

13. An illumination device, according to claim 12, wherein said distal end is inclined by between 91 degrees and 100 degrees against its longitudinal axis of said radiation member.

14. An illumination device, according to claim 3, wherein said distal end of said radiation member is a convexly curved end.

15. An illumination device, according to claim 3, wherein said plurality of scattering regions have strip shapes.

16. An illumination device, according to claim 3, wherein said plurality of scattering regions are arranged such that a ratio of an area of one region to that of adjacent region becomes larger as said one region becomes distant from said proximal end and said radiation member, so that the luminance of said radiated light is uniform along said radiation member.

17. An illumination device, according to claim 3, wherein said plurality of light scattering regions are formed from a plurality of resin films bearing at least one substance for scattering light.

18. An illumination device, according to claim 17, wherein:

each said resin film is provided with an adhesive layer on the back so as to be attached on the radiation member, the refractive index $n_t$ of said adhesive layer satisfying the condition in that $$0.95n_0 < n_t < 1.05n_0$$

where $n_0$ is the refractive index of said radiation member.

19. An illumination device, according to claim 3, wherein said radiation member has a cross-sectional shape being selected from the group consisting of a circle, an ellipse, and a polygon with more than four sides and angles.

20. An illumination device, according to claim 3, wherein said radiation member is a tapered rod.

21. An illumination device, according to claim 2, flier comprising an opal light diffuser being placed in such a position that said light diffuser is irradiated by said radiated light from said radiation member.

22. An illumination device, according to claim 2, further comprising a transparent radiation plate having a planar side which opposes said radiation member so that said radiated light from said radiation member is coupled into said radiation plate, and radiated from a front surface of said transparent radiation plate.

* * * * *